US008441372B2

(12) United States Patent
Smith et al.

(10) Patent No.: US 8,441,372 B2
(45) Date of Patent: *May 14, 2013

(54) WIRELESS BROADBAND COMMUNICATIONS NETWORK FOR A UTILITY

(75) Inventors: Ronald Smith, Troy, IL (US); Mark Thompson, Westlake, OH (US)

(73) Assignee: Aclara Power-Line Systems, Inc., St. Louis, MO (US)

(*) Notice: Subject to any disclaimer, the term of this patent is extended or adjusted under 35 U.S.C. 154(b) by 540 days.

This patent is subject to a terminal disclaimer.

(21) Appl. No.: 12/709,913

(22) Filed: Feb. 22, 2010

(65) Prior Publication Data

US 2010/0214123 A1    Aug. 26, 2010

Related U.S. Application Data

(60) Provisional application No. 61/154,037, filed on Feb. 20, 2009.

(51) Int. Cl.
*G08B 23/00* (2006.01)
*G08C 15/06* (2006.01)

(52) U.S. Cl.
USPC .................................. 340/870.02; 340/870.03

(58) Field of Classification Search ............ 340/870.02, 340/870.05, 870.03, 870.04; 700/286, 291; 705/412
See application file for complete search history.

(56) References Cited

U.S. PATENT DOCUMENTS

| 3,942,168 A | 3/1976 | Whyte |
|---|---|---|
| 3,942,170 A | 3/1976 | Whyte |
| 3,967,264 A | 6/1976 | Whyte et al. |
| 4,065,763 A | 12/1977 | Whyte et al. |
| 4,551,812 A | 11/1985 | Gurr et al. |
| 5,576,700 A | 11/1996 | Davis et al. |
| 6,043,642 A | 3/2000 | Martin et al. |
| 6,124,806 A | 9/2000 | Cunningham et al. |
| 6,195,018 B1 | 2/2001 | Ragle et al. |
| 6,377,037 B1 | 4/2002 | Burns et al. |
| 6,492,910 B1 | 12/2002 | Ragle et al. |
| 6,633,825 B2 | 10/2003 | Burns et al. |
| 6,665,620 B1 | 12/2003 | Burns et al. |
| 6,801,865 B2 | 10/2004 | Gilgenbach et al. |
| 6,856,257 B1 | 2/2005 | Van Heteren |
| 6,885,309 B1 | 4/2005 | Van Heteren |

(Continued)

*Primary Examiner* — Peguy Jean Pierre
(74) *Attorney, Agent, or Firm* — Polster, Lieder, Woodruff & Lucchesi, L.C.

(57) ABSTRACT

A communications network (12) for use by a utility (10) for communication, command, and control of the utility's distribution area for gas, water and electrical services including the utility's distribution system, security, workforce, and asset management. The network includes apparatus for obtaining information and data concerning usage of the electricity, gas, or water by each of the utility's customers, the operation of installations throughout the system, and how electricity, gas, or water is being distributed throughout the system. The information and data from each source (16) is processed to provide an up-to-date overview of the system and its operation to the utility's management and operating personnel. This includes identification of any current problems, including distribution or security, within the system, and asset monitoring and management to identify possible future problems which may occur within a predetermined period of time. Reports generated as a result of processing the information and data, besides providing current status information, also provide management and operating personnel with information as to ways of alleviating any current problems identified within the system, and steps which can be taken to forestall possible future problems which are identified.

15 Claims, 6 Drawing Sheets

U.S. PATENT DOCUMENTS

| | | |
|---|---|---|
| 6,885,674 B2 | 4/2005 | Hunt et al. |
| 6,965,319 B1 | 11/2005 | Crichlow |
| 6,985,087 B2 | 1/2006 | Soliman |
| 6,995,685 B2 | 2/2006 | Randall |
| 7,009,379 B2 | 3/2006 | Ramirez |
| 7,043,380 B2 | 5/2006 | Rodenberg, III et al. |
| 7,091,878 B2 | 8/2006 | Holle et al. |
| 7,135,850 B2 | 11/2006 | Ramirez |
| 7,142,094 B1 | 11/2006 | Davidow et al. |
| 7,173,935 B2 | 2/2007 | Lou et al. |
| 7,230,544 B2 | 6/2007 | Van Heteren |
| 7,231,281 B2 | 6/2007 | Costa |
| 7,245,472 B2 | 7/2007 | Davidow |
| 7,274,305 B1 | 9/2007 | Luttrell |
| 7,274,975 B2 | 9/2007 | Miller |
| 7,283,063 B2 | 10/2007 | Salser, Jr. |
| 7,283,916 B2 | 10/2007 | Cahill-O'Brien et al. |
| 7,301,475 B2 | 11/2007 | Salazar Cardozo |
| 7,304,586 B2 | 12/2007 | Wang et al. |
| 7,348,769 B2 | 3/2008 | Ramirez |
| 7,362,232 B2 | 4/2008 | Holle et al. |
| 7,433,465 B2 | 10/2008 | Casey et al. |
| 7,454,006 B2 | 11/2008 | Phillips et al. |
| 7,480,369 B2 | 1/2009 | Magarasevic et al. |
| 7,557,729 B2 * | 7/2009 | Hubbard et al. ......... 340/870.02 |
| 7,843,834 B2 | 11/2010 | Picard |
| 8,010,240 B2 | 8/2011 | Mattiocco |
| 8,174,405 B2 * | 5/2012 | Edwards et al. ......... 340/870.02 |
| 2009/0248214 A1 * | 10/2009 | Fickey et al. ................. 700/286 |
| 2010/0076835 A1 | 3/2010 | Silverman |

* cited by examiner

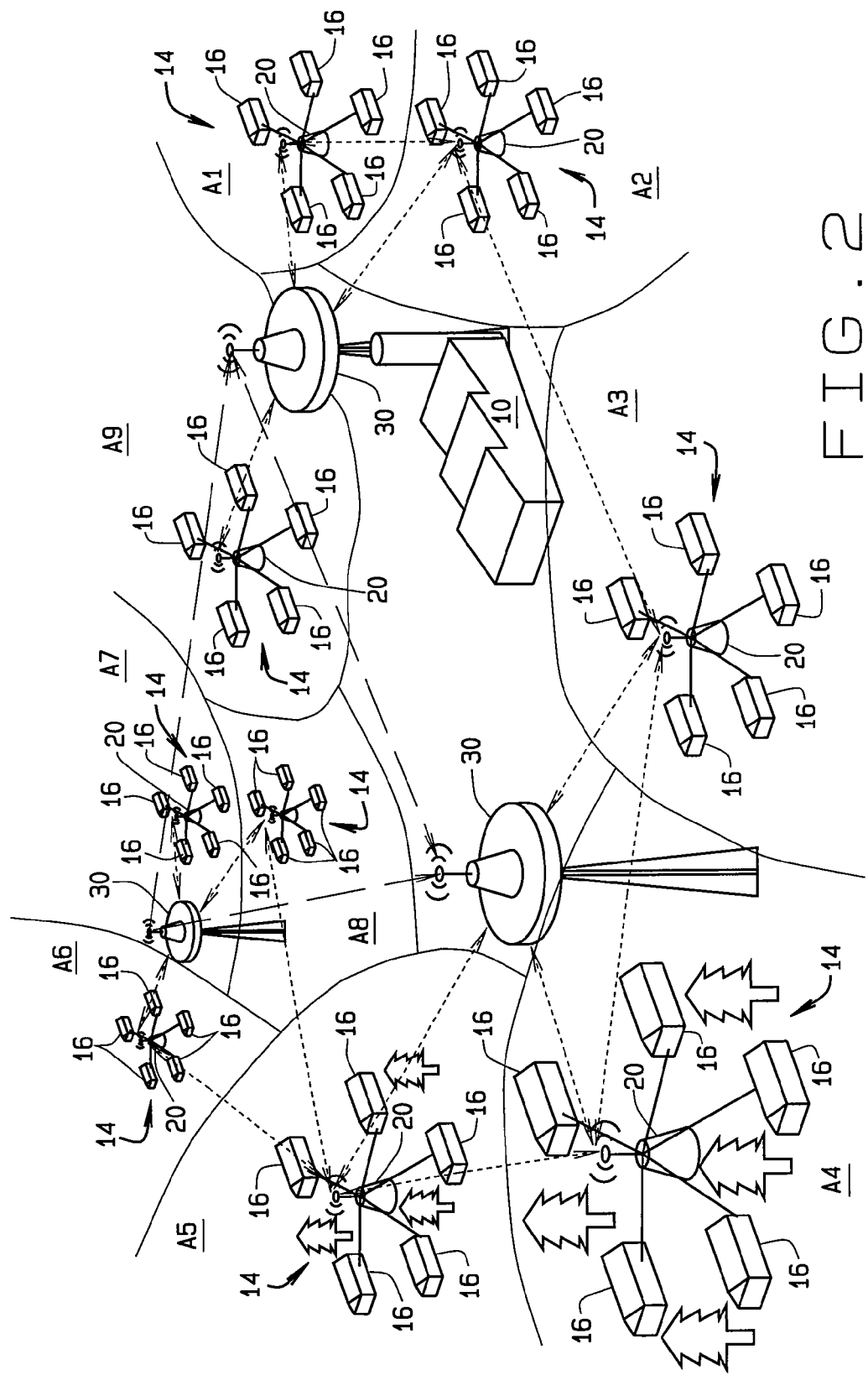

WIRELESS BROADBAND COMMUNICATIONS NETWORK FOR A UTILITY

CROSS-REFERENCE TO RELATED APPLICATIONS

U.S. provisional patent application 61/154,037 filed Feb. 20, 2009

STATEMENT REGARDING FEDERALLY SPONSORED RESEARCH

N/A.

BACKGROUND OF THE INVENTION

This invention relates to communications in the distribution system for a utility such as water, gas, or electrical utilities which may have numerous urban, suburban, and rural customers. More particularly, the invention relates to a multi-tiered communication system by which the utility can, among other things, quickly and reliably communicate with its customers, regardless of their location, so to ascertain information concerning the utility's operation throughout the system. This would include, for example, determining if there is an electrical outage within the system, or a gas line or water line break, the extent of any resulting problem, controlling and managing the utility's field workforce, monitoring the utility's assets where they are located (i.e., in situ), control of the distribution components of the utility in a timely manner, implement security monitoring when needed, and control of the level of demand during peak periods of usage of the electricity, gas, or water provided by the utility.

Electrical, water, and gas utilities serve a wide variety of customers. It is commonplace for a utility to provide a commodity such as water, gas, or electricity to consumers in urban, densely populated areas, suburban areas which are not so densely populated and rural areas where there are often substantial distances between customers. It is also commonplace for the utility to provide service to industrial consumers who place very rigorous demands on the utility; to businesses of many types which, while perhaps not as demanding, still may have unique requirements; and, to residential customers whose demands are relatively uniform across a broad spectrum of customers.

Heretofore, it has been difficult for a utility to provide a service unique to each individual customer. There are a number of reasons for this. First, it will be recognized that a utility operates at a number of different levels. Topmost is the overall system. At this level, the utility needs to be cognizant of the gross demand on its generating and/or delivery capability and its distribution system, and determining if it is operating near or at capacity. For an electrical utility, for example, this can include determining if it needs to timely bring additional generating capacity on-line, buy additional electricity in the marketplace to accommodate short term peak demands and prevent blackouts or brownouts, or institute a load shedding or demand response protocol by which load on the system is reduced to levels of consumption which the utility can sustain with its available generating capacity. Likewise, water and gas utilities have unique needs that must be met. For example, during times of drought, a water utility may need to monitor and control water consumption and prevent unnecessary or extravagant usages of water. Gas utilities, for example, may need to monitor gas consumption, gas line pressures throughout the system, cathodic corrosion, etc. This monitoring is accomplished using a number of sensor based communication points strategically located throughout the utility's distribution area.

The next level relates to various regions in the system. While these regions are primarily geographic (urban, suburban, rural), each region usually includes a number of subregions. At this level, an electrical utility, for example, is concerned about distribution matters such as power outages which tend to be localized; although it will be appreciated that a number of outages can occur at the same time (as, for example, during a storm). Further, utilities supplying electricity, water, or gas, experience periods of peak demands within different regions. For example, in urban areas where manufacturing industries and large businesses tend to be clustered, higher or peak demands are typically experienced during the daytime hours (mid-morning to late afternoon) while suburban (residential) areas tend to experience higher or peak demands during early-morning, late-afternoon, and evening hours when people are at home.

Third, is the level of individual users or consumption points. This level involves such things as automatically reading multiple utility meters installed at a customer's location to determine current and overall commodity consumption. For communication purposes, a meter is installed at each customer's location. An electrical utility then has the ability to communicate with all of the meters on the same feeder line to determine, for example, if there is an electrical outage in a particular region and, if so, its extent. The utility can also communicate through the meter to control the amount of electrical usage in a region at times of peak demand. It does this using load control equipment in communication with the meter. Further, the meter can communicate with the utility at anytime (i.e., an unsolicited communication) if an outage occurs at the location of the meter, or for other reasons.

Because of the range of population density within the geographic area serviced by a utility, some utilities have found it advantageous to communicate with their customers using various different methods. In highly populated urban and suburban areas, utilities have started using a radio-frequency (RF) based communications system in which data and other information is transmitted to and from electrical, gas and water meters, load control units, and other devices via RF. In outlying, lesser populated areas, communications to and from users' devices are sent over transmissions lines using, for example, a two-way automated communications system such as TWACS® which is used by electrical utilities.

With respect to RF communications, utilities are now investigation the use of a wireless mesh network (WMN). Such a network typically comprises a number of radio nodes organized according to some topology. An advantage of a properly deployed WMN is that it provides a high bandwidth communications path which can carry substantial amounts of data and other information over the area of coverage when operating in a multi-tier configuration.

BRIEF SUMMARY OF THE INVENTION

The present disclosure is directed to a multi-tiered communication network for a utility, for use by the utility for communication, command, and control of a commodity supplied by the utility through the utility's gas, water, or electrical distribution system. The network includes various apparatus by which the utility obtains information and data concerning commodity usage by each of the system's customers, operation of various installations (e.g., substations or data collection points) throughout the system, and how the commodity is distributed throughout the system. Information and data from each source is processed to provide system management an up-to-date overview of the system and its operation. This includes identifying any current problems within the system and possible future problems which may occur within a predetermined period of time. In addition to providing system management information on the current operational status of the system, the communication network transmits reports identifying any current problems within the system, ways of alleviating a problem, and steps which can be taken to forestall possible future problems. This latter includes identifying locations where outages or leaks may soon occur, aging assets needing repair, replacement, etc.

The network comprises a first tier that supports both wired and wireless nodes. The nodes include various sensors, instrumentation and remote monitoring devices installed at various sites including homes, factories, buildings and other facilities located throughout the utility's distribution area. A second tier of the system incorporates a plurality of data collection units (DCUs or substation points) to which information collected by the sensors, instrumentation and other devices is transmitted. A plurality of DCUs is employed in the system with each DCU collecting information from sites within a prescribed geographic area. Information from the respective sites is transmitted to the DCU at a first frequency. The DCUs within adjoining areas then transmit the information collected by the respective units to a central or regional site; e.g., a tower. This collected information is transmitted to the site at a second and higher frequency. Regardless of the transmission frequency used, adequate bandwidth is available for timely and reliable transmission of all data and other information.

The various sites within the system are meshed together to facilitate both data handling and ease of communication if, for example, a portion of the communications system is currently unusable or unreliable for some reason. It is a particular advantage of the system to rapidly handle significant amounts of information collected from throughout the area serviced by the utility, process that information so to provide a current overview of the utility's operations, and to quickly and reliably react to situations which arise at any location within the service or distribution area.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 2 is a representation of a first embodiment of a multi-tiered communication system of the present invention for use by a utility;

Corresponding reference characters indicate corresponding parts throughout the several views of the drawings.

DETAILED DESCRIPTION OF THE INVENTION

Figure 1A:
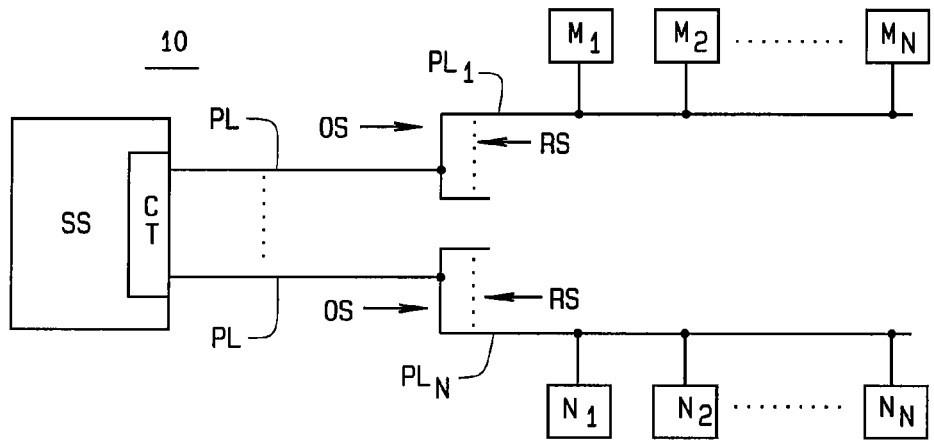
FIGS. 1A and 1B illustrate prior art communications systems used by a utility.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to the drawings, FIG. 1A illustrates a communications system currently in use in which communications are sent to and from a communications terminal CT located at a substation SS or the like of a utility 10. An outbound signal OS is sent over a power line PL1-PLn to electrical meters M1-Mn and N1-Nn installed at various customer facilities. In response to a command or instructions encoded within the signal, the meters provide information back to the transmission site by a reply signal RS, or pass along the command to a device (e.g., a load control unit) at the facility which carries out a required action. Each meter has its own unique identifier so that it can individually receive from, and send communications to, the communications terminal.

Figure 1B:
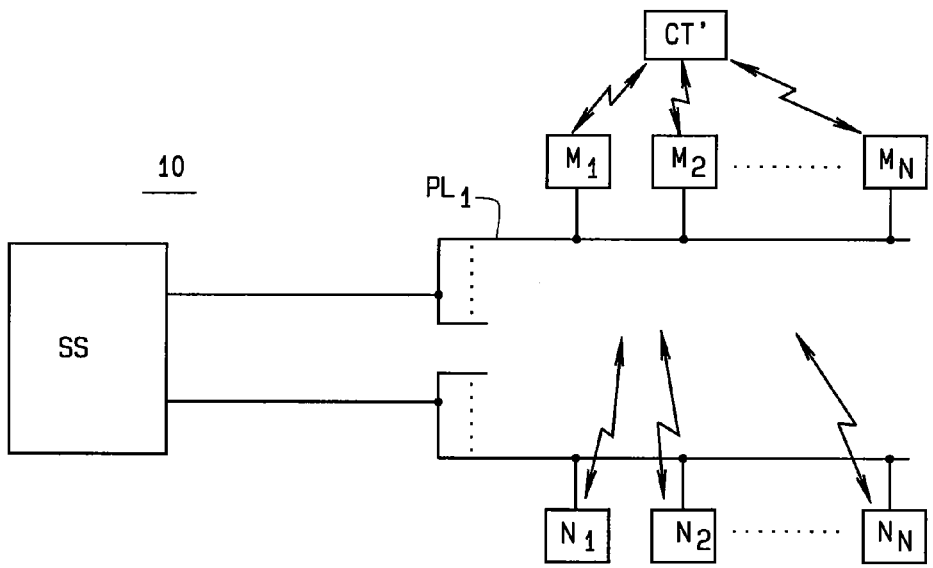

In FIG. 1B, a communications system includes a communications terminal CT' which, rather than transmitting to, and receiving messages from, the meters over the power lines, employs an RF communications link for this purpose. Again, each meter responds to commands or instructions within a signal to provide information back to the terminal, or forward a command to a device coupled to the meter which executes a requested operation.

In accordance with the present invention, and as shown in FIG. 2, a communication system or network 12 now provided for utility 10 is a multi-tier communications network. Network 12 includes a first tier, generally indicated 14, that supports both wired and wireless nodes 16. The nodes, which can be one of a variety of facilities such as homes, factories, office buildings, hospitals, etc., include electrical meters and other sensors and instrumentation, remote monitoring equipment including supervisory control and data acquisition ("SCADA") units, and advanced metering infrastructure ("AMI") or smart grid type applications. The facilities represented by the various nodes 16 are clustered together within a defined geographic portion of the area serviced by utility 10 and its communication network 12. Thus, as shown in FIG. 2, nine separate geographic areas A1-A9 are, for example, serviced by communications network 12.

Located within each geographic area is a data collection unit (DCU) 20. The DCUs comprise a second tier of the communications network. A plurality of nodes 16 are clustered about each DCU with each node separately communicating with its associated DCU. Regardless of the type of device or devices located at each node, data and information collected at the site comprising each node is transmitted from the node to the DCU at a frequency within a selected frequency band; there being sufficient bandwidth to efficiently transmit the required information from the node to the DCU, and any commands or instructions from the utility back to the node through the DCU. The transmission frequency between each node and its associated DCU is, for example, 450 MHz. Data transmission is done, for example, using a frequency shift keying (FSK) modulation technique. Using an underlying frequency of 450 MHz, and a channel spacing of, for example, 12.5 KHz, FSK allows a baud rate of up to approximately 1200 baud. This baud rate is very acceptable for communications between the nodes and a DCU, and readily accommodates the amount of data being transmitted.

Current transmitter design includes a "wave shaper" circuit (not shown) which creates the FSK on the RF carrier given an input digital data stream. This wave shaper is implemented in hardware. Other DCU implementations include a transceiver board (also not shown) with a high-end MSP430 microcontroller. This microcontroller has a direct memory access (DMA) controller. In concert with the DMA, a software wave shaper has been implemented so the software controls modulation of the data.

Those skilled in the art will understand that other modulation techniques can be used. One technique which is particularly advantageous is quadrature phase shift keying (QPSK). With QPSK modulation, the baud rate can be increased to as high as 9600 baud. The software referred to above can be modified to change a DCU from transmitting using FSK to transmitting using QPSK. Use of QPSK not only benefits communications between nodes and a DCU, but also provides benefits regarding backhaul communications. A 9600 baud backhaul channel will readily handle the data requirements of the system. One benefit of this, for example, is the elimination of any dependence on cellular carriers for communications between nodes and a DCU, and the limiting or elimination of operation costs related to such carriers.

As further shown in FIG. 2, each DCU communicates with a regional center 30 indicated in the drawings by a tower. One of the towers 30 comprises a network operations center (NOC) for utility 10. Communication between a DCU 20 and a tower 30 are at a second and higher frequency than the frequency at which a DCU communicates with the nodes associated with it. Again, the bandwidth at this frequency which is, for example, 900 Mhz, is sufficient for the volume of information being exchanged between the DOC and a tower 30 or the NOC. Communications between a DOC and its associated tower or the NOC is continuous, or on a call-up basis. With respect to the former, a multiplexing protocol is established between the DOC and the nodes reporting to it. With respect to the latter, when the DOC has collected a requisite amount of information from its associated nodes, it executes a call-up protocol similar, for example, to someone using a prepaid phone card, to access the NOC and once the call is put through, transfer its collected information.

As also shown in FIG. 2, besides directly communicating with its nearest tower 30 or the NOC, each DCU can also communicate with adjacent DCU's so that an indirect path can be established from a DCU to its associated NOC. Also, each NOC can communicate with each of the other NOCs in the system. The result is a meshed communications network or system 20 by which numerous routings are, or can be, established to route information from a meter or other device at a facility to the utility for collection and processing by the utility in order to monitor and control operations within the utility. Those skilled in the art will understand that a particular communication path or routing may be transitory depending upon conditions within the system at the time a communication is sent. For example, a routing table (not shown) is dynamically generated to direct communications between routers and the controller based upon the deployed area or topography using the various routing paths shown in FIG. 2.

Communications system 20 is designed to fully support the needs of utility 10 which encompass, inter alia, automatic meter reading (wired or wireless) or infrastructure, demand response and associated applications such as load control or in-home communications, distribution automation where higher communication speeds are needed for applications such as feeder switching, capacitor (cap) bank monitoring, SCADA, etc., mobility applications supporting workforce management or in-truck communications, security applications for utility assets such as distribution or transmission substations or water/gas distribution and sensor applications such as leak detection, cathodic detection, partial discharge systems, or monitoring of the utility's assets in general.

As shown in FIGS. 3A-3C, and 4, system 12 can be arranged in a number of configurations. In communications system 12A of FIG. 2A, for example, a DCU 22 is interposed in a number of the paths between a DCU 20 connected to nodes 16, and a NOC 30. The intermediate DCUs 22 act as relays between the DCUs 20 and NOC 30, and are useful where there are substantial distances between the DCUs 20 and the NOC.

Figure 3A:
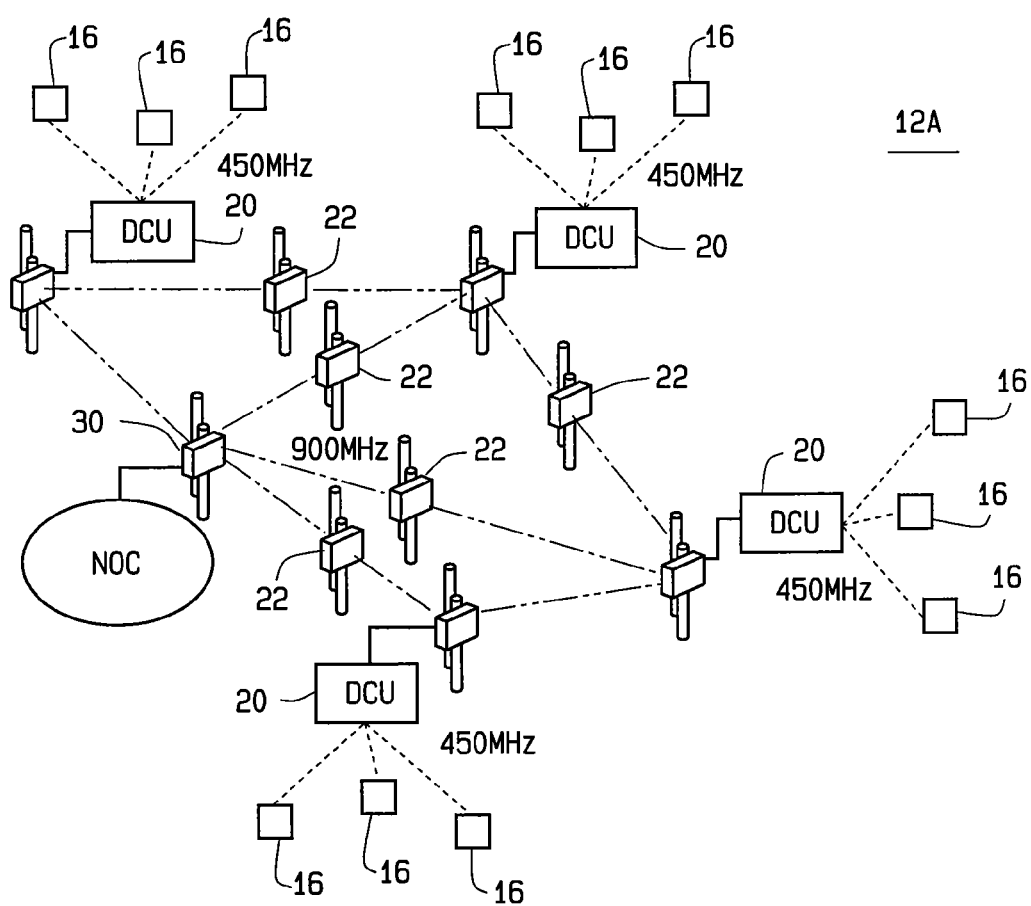
FIGS. 3A-3C are representations of other embodiments of the communication system; and, FIG. 4 is a representation of a preferred embodiment of the system.
Figure 3B:
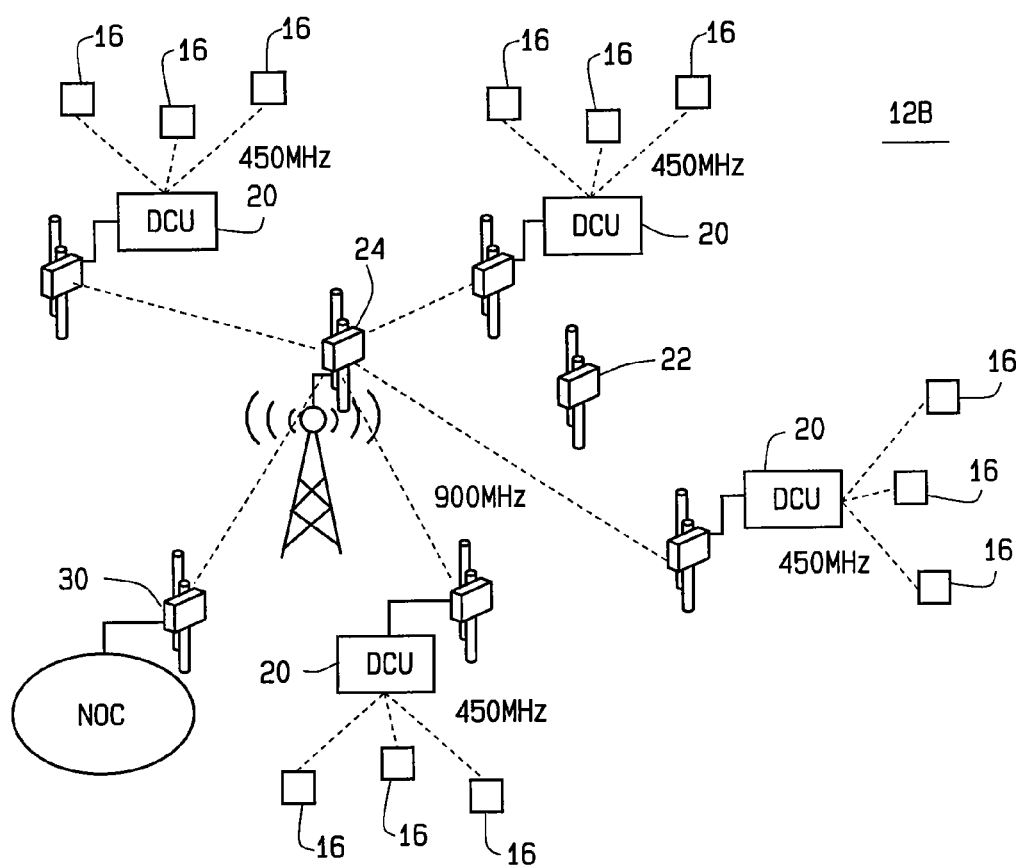

Referring to FIG. 3B, in a communications system 12B, each DCU 20 is shown as communicating with a central DCU 24 which is a tower mounted unit. DCU 24, in turn, communicates with NOC 30.

Figure 3C:
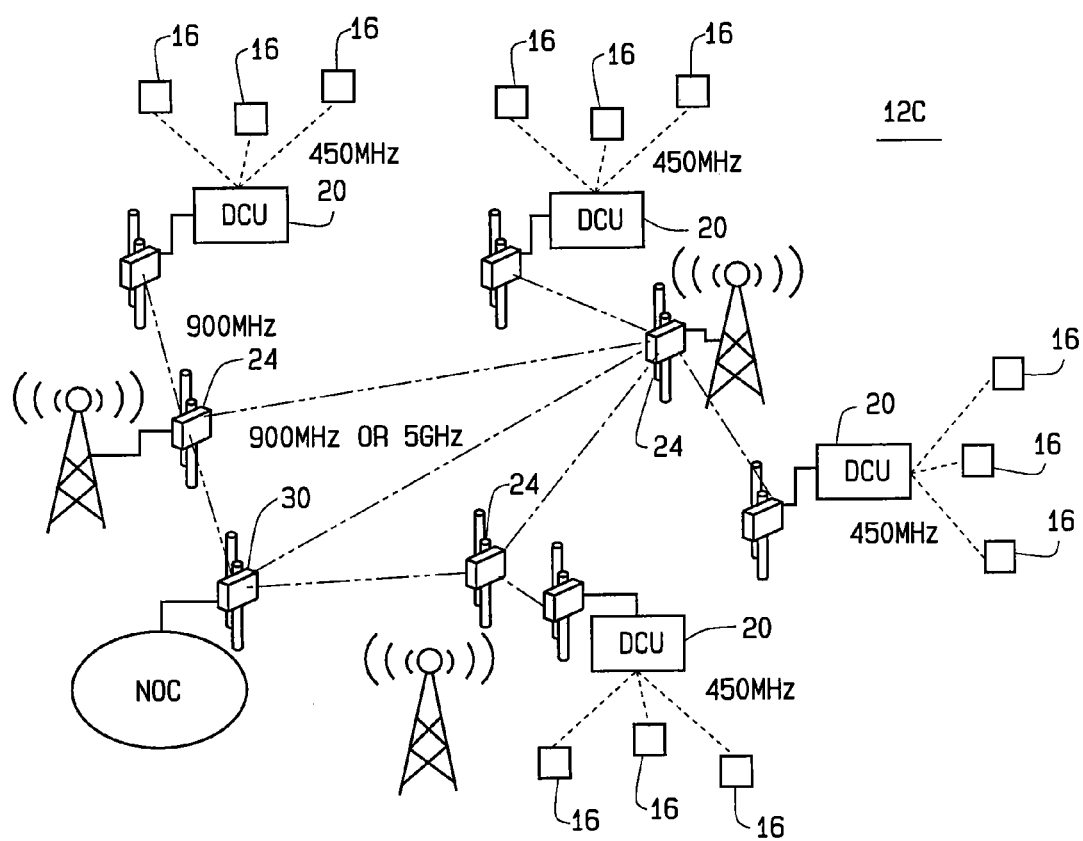

Referring to FIG. 3C, a communications system 12C is similar to that shown in FIG. 3B, except that one or more DCUs 20 communicate with a DCU 24 which, again, is a tower mounted unit. The DCUs 24 communicate both with each other, as well as with NOC 30. Accordingly, multiple communications paths are established by which information from individual nodes is routed to the network operations center.

Figure 4:
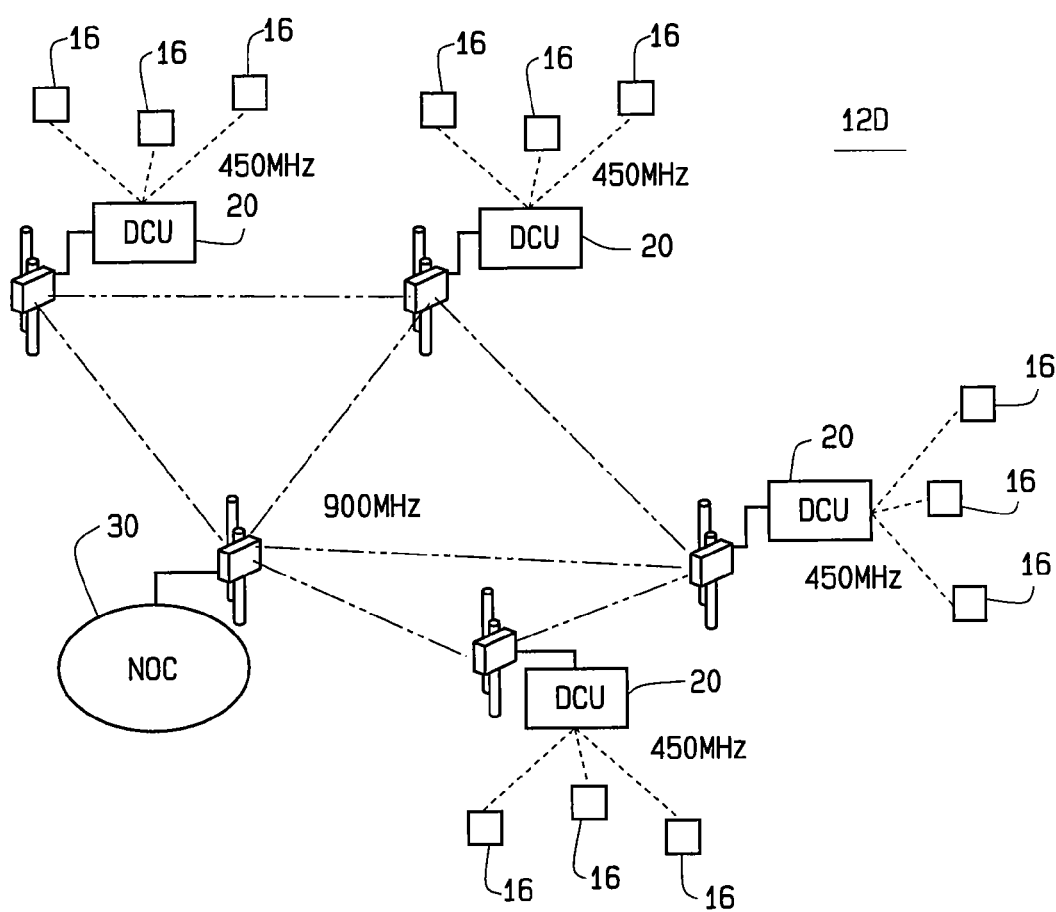

In FIG. 4, communications system 12D includes a number of DCUs 20 communicating with their associated nodes 16. Now, instead of intermediate DCUs 24, each DCU 20 communicates with at least one other DCU 20, and directly with NOC 30. Again, there are multiple communications paths which can be used to mesh together all of the communications requirements for the system.

Regardless of the configuration of the communications system 20, all of the DCUs 20 can hop data back to utility 10 where a DCU has an Ethernet connection to the utility's networks. In addition, and especially in larger utilities, the system interfaces with, or is connected into, a frame relay or fiber points deployed by the utility.

Those skilled in the art will appreciate that other system configurations, while not described, are possible within the scope of the invention.

Finally, while the above described communications system is for an electrical utility, it will be understood that the system is readily implemented for other types of utilities such as those providing water and gas. It will also be understood that two or more utilities servicing generally the same population and geographic area can use a combined system which collects relevant data from a customer for separate use by each respective utility. Such a combined system offers economies of scale with respect to installation, operation and maintenance.

In view of the above, it will be seen that the several objects and advantages of the present disclosure have been achieved and other advantageous results have been obtained.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A communications network for use by a utility for communication, command, and control of the utility's commodity distribution system comprising:
    apparatus obtaining information and data concerning each customer's usage of the commodity supplied by the utility, operation of the utility's distribution system to supply the commodity to the customers, and distribution of the commodity throughout the system;
    means processing the information and data from each source thereof to provide an up-to-date overview of the system and its operation, to identify any current problems within the system, and to identify possible future problems within the system which may occur within a predetermined period of time; and,
    to provide system management with reports on the current status of the system, ways of alleviating any current problems identified within the system, and steps which can be taken to forestall any identified possible future problems.

2. A multi-tier communications network for use by a utility for communication, command, and control of the system comprising:
    a first tier including apparatus obtaining information and data concerning usage by each customer of a commodity supplied by the utility, operation of the utility's distribution system, and the distribution of the commodity throughout the system;
    a second tier to which the information and data gathered from customer facilities within a defined geographic area comprising a portion of the first tier is communicated, the second tier including a data collection means within each geographic area which receives and collects the information and data; and,
    a third tier to which the information and data gathered by each data collection means is communicated, the third tier including a network operations center for collecting and evaluating all the information and data from the system to determine a current operational status of the utility's distribution system.

3. The communications network of claim 2 in which information and data is communicated from customer facilities within a defined geographic area to the data collection means for that area at one frequency, and from the data collection means to the network operations center at a second frequency.

4. The communications network of claim 3 in which communications between facilities and a data collection means is at a frequency of approximately 450 MHz.

5. The communications network of claim 4 in which communications between the data collection means and the network operations center is at a frequency of approximately 900 MHz.

6. The communications network of claim 3 in which the data collection means, when it has collected a requisite amount of information, executes a call-up protocol to access the network operations center and transfer its collected information.

7. The communications network of claim 2 wherein each network operations center collects information and data from more than one data collection means.

8. The communications network of claim 7 wherein the data collection means in one geographic area communicates the information and data collected by the data collection means to a data collection means in an adjacent geographic area thereby to establish an alternate communications path between the data collection means and the network operations center.

9. The communications network of claim 8 in which the third tier further includes a plurality of regionally spaced towers to which information and data collected by data communication means within a region are communicated, the towers communicating with the network operations center.

10. The communications network of claim 9 in which the data collection means in one region communicates with a tower in an adjacent region thereby to establish an alternate communications path between the data collection means in the one said region and the network operations center.

11. The communications network of claim 2 further including a relay data collection means interposed in each path between a data collection means and the network operations center to facilitate transmissions between each data collection means and the network operations center.

12. The communication network of claim 2 in which the utility supplies electricity.

13. The communication network of claim 2 in which the utility supplies gas.

14. The communication network of claim 2 in which the utility supplies water.

15. The communication network of claim 2 for concurrent use by at least two utilities each of which supplies a different commodity.

* * * * *